(12) United States Patent
Bockman et al.

(10) Patent No.: US 10,113,058 B2
(45) Date of Patent: Oct. 30, 2018

(54) CLEAR AND IMPACT RESISTANT POLYMER COMPOSITION AND FABRICATED ARTICLE

(71) Applicant: Braskem America, Inc., Philadelphia, PA (US)

(72) Inventors: Leslie Bockman, Pittsburgh, PA (US); Elliot Carnevale, Pittsburgh, PA (US); Jon Scott Larson, Pittsburgh, PA (US); Kevin Herrington, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 15/390,005

(22) Filed: Dec. 23, 2016

(65) Prior Publication Data

US 2017/0190892 A1 Jul. 6, 2017

Related U.S. Application Data (60) Provisional application No. 62/273,085, filed on Dec. 30, 2015.

(51) Int. Cl.
| | |
|---|---|
| *C08L 23/12* | (2006.01) |
| *B29C 49/00* | (2006.01) |
| *B29C 51/00* | (2006.01) |
| *C08L 23/20* | (2006.01) |
| *C08L 23/24* | (2006.01) |

(52) U.S. Cl.
CPC .......... *C08L 23/12* (2013.01); *B29C 49/0005* (2013.01); *B29C 51/002* (2013.01); *C08L 23/20* (2013.01); *C08L 23/24* (2013.01); *C08L 2203/30* (2013.01); *C08L 2205/00* (2013.01); *C08L 2666/06* (2013.01)

(58) Field of Classification Search
CPC ... B29C 49/0005; B29C 51/002; C08L 23/24; C08L 23/20; C08L 23/12; C08L 2205/00; C08L 2203/30; C08L 2666/06
See application file for complete search history.

(56) References Cited

U.S. PATENT DOCUMENTS

| | | | |
|---|---|---|---|
| 2006/0089471 A1 | 4/2006 | Datta et al. | |
| 2006/0173132 A1 | 8/2006 | Mehta et al. | |
| 2009/0306299 A1* | 12/2009 | Kipke et al. | C08F 10/00 525/240 |
| 2012/0302701 A1 | 11/2012 | Martin et al. | |
| 2015/0307698 A1* | 10/2015 | Tranninger | C08L 23/12 523/348 |

FOREIGN PATENT DOCUMENTS

WO 2015/150467 A1 10/2015

OTHER PUBLICATIONS

International Search Report and Written Opinion issued for International Patent Application No. PCT/US16/68533, dated Mar. 17, 2017, 9 pages.

"Designation D 5492-98: Standard Test Method for Determination of Xylene Solubles in Propylene Plastics" (ASTM International) Nov. 2003 (Nov. 2003); entire document, but especially: p. 1 col. 1 para 1.

Designation D 648-07: Standard Test Method for Deflection Temperature of Plastics Under Flexural Load in the Edgewise Position (ASTM International) Dec. 4, 2007 (Dec. 4, 2007); entire document, but especially: p. 1 col. 2 para 3.

* cited by examiner

*Primary Examiner* — Nathan M Nutter
(74) *Attorney, Agent, or Firm* — Duane Morris LLP (57) ABSTRACT

A polymer composition providing optical clarity and impact resistance includes from about 40 weight percent (wt. %) to about 99.9 wt. % (e.g., 50-95 wt. %) of a continuous matrix, and from about 0.01 wt. % to about 60 wt. % (e.g., 5-50 wt. %) of a dispersed phase. The weight percentages of the matrix phase and the dispersed phase are based on the total weight of the matrix phase and the dispersed phase. The matrix phase may comprise a polypropylene polymer comprising from 0 to 7 mole percent (mol. %) of units derived from ethylene, a $C_4$-$C_{10}$ alpha olefin or combinations thereof. The dispersed phases may be a propylene/alpha olefin copolymer having from 10 mol. % to 70 mol. % of units derived from ethylene or a $C_4$-$C_{10}$ alpha olefin or combinations thereof.

20 Claims, 6 Drawing Sheets

A. Polymer B1 (Haze = 96.2%)

FIG. 4A

B. 70% Polymer A1 and 30% Polymer B1
(Haze = 12.4%)

FIG. 4B

C. 70% Polymer A6 and 30% Polymer B1
(Haze = 35.5%)

FIG. 4C

D. 70% Polymer A8 and 30% Polymer B1
(Haze = 59.9%)

CLEAR AND IMPACT RESISTANT POLYMER COMPOSITION AND FABRICATED ARTICLE

RELATED APPLICATIONS

This application claims the benefit of U.S. Provisional Application No. 62/273,085, filed Dec. 30, 2015, which application is expressly incorporated by reference herein in its entirety.

FIELD OF THE INVENTION

The disclosure relates to polymers generally. More particularly, the disclosed subject matter relates to a polymer composition and a fabricated article comprising a polypropylene (PP) copolymer, and the method of making the composition and the article.

BACKGROUND OF THE INVENTION

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To address these issues, manufacturers have incorporated a dispersed copolymer phase (often called a "rubber" phase), which forms a dispersed phase within the polypropylene matrix. These two-phase materials are referred to as impact copolymers or ICPs.

While impact resistance is improved, a major drawback to such materials is the poor transparency, mostly due to the rubber particles being large enough to affect light transmission or a refractive index mismatch in the heterophasic system. Accordingly, several attempts have been made to improve the transparency of heterophasic polymer systems.

Some ICPs have been able to achieve clarity by refractive index matching the dispersed phase to the matrix material. Other ICPs have sought to achieve clarity by increasing dispersed phase miscibility to achieve particles which are not large enough to affect the light transmission. Known ICPs generally do not provide a combination of good properties including stiffness, toughness and optical transparency.

SUMMARY OF THE INVENTION

The present invention provides a polymer composition, a fabricated article comprising such a composition, and methods of making the same.

In one aspect, a polymer composition is provided. The polymer composition comprises from about 40 weight percent (wt. %) to about 99.9 wt. % (e.g., 50-95 wt. % or 75-92%) of a continuous matrix phase; and from about 0.01 wt. % to about 60 wt. % (e.g., 5-50 wt. %) of a dispersed phase. The weight percentages of the matrix phase and the dispersed phase are based on the total weight of the matrix phase and the dispersed phase. The matrix phase may comprise a polypropylene polymer comprising from 0 to 7 mole percent (mol. %) (e.g., 0.01-4 mol. %) of units derived from ethylene, a $C_4$-$C_{10}$ alpha olefin or combinations thereof. The dispersed phases may be a propylene/alpha olefin copolymer having from 10 mol. % to 70 mol. % (e.g., from 35 mol. % to 60 mol. %) of units derived from ethylene or a $C_4$-$C_{10}$ alpha olefin or combinations thereof.

The polymer composition satisfies the following inequality:

$$y \leq 55x - 8,$$

wherein x is a ratio of Mw solubles/Mw insolubles and is less than or equal to 0.85, Mw solubles is weight average molecular weight of a soluble fraction of the polymer composition in xylene at 25° C. following ASTM D5492, Mw insoluble is weight average molecular weight of an insoluble fraction of the polymer composition in xylene at 25° C. following ASTM D5492, and y is the haze value being measured on an injection molded plaque having a thickness of 0.508 millimeter (20 mil) according to ASTM D1003.

In some embodiments, the dispersed phase has an intrinsic viscosity from about 0.5 to about 3. In some embodiments, the matrix phase has a melt flow rate (MFR) from about 0.1 dg/min. to about 10 dg/min. (for example, from about 0.1 dg/min. to about 2 dg/min.). The dispersed phase has a melt flow rate (MFR) of from about 10 dg/min. to about 200 dg/min. (for example, from about 20 dg/min. to about 60 dg/min.). The melt flow rates in this disclosure are measured using a load of 2.16 kg at 230° C. following ASTM D 1238. The matrix phase may comprise from about 0.01 mol. % to about 5 mol. % of ethylene in some embodiments.

In some embodiments, the polymer composition comprising the matrix phase and the dispersed phase is made through an in-reactor process. The monomers are feed into one or more reactors for polymerization, and a resulting polymer composition having the two-phase structure described herein is obtained.

In some other embodiments, the polymer composition comprising the matrix phase and the dispersed phase is made through a post-reactor process by blending a first polymer ingredient and a second polymer ingredient. The first polymer ingredient mainly contributes to the matrix phase while the second polymer ingredient mainly contributes to the dispersed phase. For example, the first polymer ingredient may be a propylene-based homopolymer or a random copolymer. The second polymer ingredient may be an impact copolymer (ICP). When an ICP has a two-phase structure, the ICP as the second polymer ingredient may contribute to a portion of the matrix phase of the resulting polymer composition. The matrix phase of the resulting polymer composition as described herein includes the first polymer ingredient and the matrix portion of the second polymer ingredient. The matrix phase is a combined matrix phase.

The polymer composition may further comprise a clarifying agent. The clarifying agent may be present at a final concentration equal to or less than 8,000 ppm (e.g., 1-8,000 ppm). The dispersed phase in the matrix phase may have a phase domain size smaller than 700 nm (e.g., from 0.1 nm to 700 nm). The polymer composition may have a melt flow rate of from about 0.5 dg/min. (or 1 dg/min.) to about 10 dg/min. (measured using a load of 2.16 kg at 230° C. following ASTM D 1238). The composition can be made through blending/compounding the ingredients.

The polymer composition may have a ratio of β/α less than 1.2 according to the formula:

$$\beta/\alpha = \frac{(MFR_1/MFR_2)^{0.213} - 1}{(Fc/100)} + 1$$

wherein $MFR_1$ is the melt flow of the matrix phase (or the combined matrix phase) only and $MFR_2$ is the overall melt flow of the polymer composition. The polymer composition may also have a polydispersity index (PDI, i.e. the ratio of Mw/Mn) greater than 4. Mw and Mn are weight average molecular weight and number average molecular weight, respectively. The resulting polymer composition provides a combination of excellent optical transparency, toughness, impact resistance and rigidity. For example, the polymer composition after being molded has a haze value less than 30%, which is measured using at an injection molded plaque having a thickness of 0.508 millimeter (20 mil) following ASTM D1003. The composition may have a flexural modulus greater than 1000 MPa (measured at 23° C. according to ASTM D 790), and a notched Izod impact strength greater than 1.4 ft-lbs/in$^2$, for example, 5 ft -lbs/in$^2$ (measured at 23° C. according to ASTM D 256). The composition may have a heat deflection temperature greater than 75° C. at 0.46 MPa (66 psi) according to ASTM D648.

In another respect, the present disclosure provides a fabricated article comprising the polymer composition described above, and a method for making the fabricated article. For example, such a fabricated article might be manufactured by a blow molding or thermoforming process. The material in the fabricated article has the structure and the properties as described above. For example, the article has a haze value less than 30% and a top load value greater than 20 lb-ft.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION OF THE INVENTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

It is desirable to have a propylene based material that is clear, stiff and tough. An impact resistant clear polypropylene based material is desired for thermoforming and blow molding.

Random copolymers, i.e., single phase polypropylene with a comonomer, have been used for applications that require clarity. These random copolymers, however, tend to be soft, and have low heat distortion temperatures. These random copolymers do not have desirable physical properties for applications where impact copolymers are normally used, particularly impact resistance at cold temperatures (e.g., about 4° C.). These materials exhibit brittle behavior around 0° C.

In order to overcome the limitation of low impact toughness, rubbers such as metallocene copolymers (elastomers and plastomers) and styrenic block copolymers are sometimes blended into polypropylene. These additives work by either (a) having refractive indices that match that of polypropylene (approximately 1.50 micron) or (b) particle sizes that are small enough not to refract light and therefore cause haze.

Incorporation of such additive components into polypropylene is not desirable, for a number of reasons. The metallocene elastomers and styrenic block copolymers are often costly to produce relative to conventional Ziegler-Natta polypropylene (ZN-PP). Moreover, multiphase propylene copolymers having good impact toughness and decreasing stiffness can be prepared by means of Ziegler-Natta catalyst systems in a multistage polymerization reaction. However, the compositions that incorporate ethylene-propylene copolymers having a high proportion of ethylene into a polymer matrix make the multiphase propylene copolymer turbid. Poor miscibility of the dispersed phase with the polymer matrix leads to a separation of the phases and thus to turbidity and to poor transparency values of the heterogeneous copolymer.

For example, in some embodiments a low melt flow impact copolymer can be blended into a low melt homopolymer in order to achieve ductile behavior for applications that require toughness (such as containers intended for refrigerator and/or freezer conditions). While these materials may be quite ductile, they are completely opaque and offer no see-through properties.

Alternatively an elastomer may be blended into a random copolymer to offer additional toughness. These elastomers provide toughness while still offering good optical properties by either matching the refractive index of PP or by being completely miscible in PP. However, these elastomers are limited in loading addition due to stickiness during processing and they typically add softness (lower stiffness and heat distortion) to the parts. In some embodiments, propylene ICPs are also made in-reactor using Ziegler-Natta catalysts.

The resulting propylene ICPs have heterophasic copolymer structure and provide high clarity, low haze and high toughness.

The inventors have invented a new approach to address this market need for stiff, tough and clear propylene based polymers by having a polymer composition having a matrix phase and a dispersed phase as described herein. The polymer composition can be made through an in-reactor process or a post-reactor blending process. In some embodiments, the polymer composition is achieved by combining a high melt flow (low molecular weight) copolymer as a dispersed phase with a very low melt flow (high molecular weight) homopolymer or copolymer as a matrix phase. Both the matrix phase and the dispersed phase are propylene-based and have specific structures as described herein. The resulting polymer composition and the fabricated article have excellent clarity, strength, toughness but low haze. The resulting material offers toughness of an impact copolymer and optical properties that are similar to a random copolymer. When the dispersed phase such as an impact copolymer (ICP) is dispersed in a homopolymer matrix, the resulting composition offers much better impact resistance than a typical impact modified homopolymer and significantly higher stiffness and a higher heat distortion temperature with equal to or better impact strength compared to a suitable random copolymer. If a dispersed phase such as an ICP having a high melt flow is dispersed in a random copolymer matrix having a low melt flow, particularly when the melt flow of the ICP is higher than that of the random copolymer, the resulting composition provides improved clarity (i.e. low haze), with a good balance of mechanical properties such as impact resistance.

The present invention provides a polymer composition, a fabricated article comprising such a composition, and methods of making the same.

The term "polymer," as used herein, refers to a polymeric compound prepared by polymerizing monomers, whether of the same or a different type. The term "homopolymer," refers to a polymer prepared from only one type of monomer, and the term "copolymer" refers to a polymer derived from two or more different monomers.

"Polypropylene" or "a propylene based polymer" refers to a polymer comprising greater than 50% by weight of units which have been derived from propylene monomer. This includes polypropylene homopolymers (derived from close to or equal to 100% of propylene), or copolymers (comprising units derived from two or more comonomers).

For brevity, unless expressly indicated otherwise, references to "polypropylene ICP" or "propylene ICP" made in the present disclosure will be understood to encompass any polypropylene copolymer having good impact resistance. In some embodiments, a propylene impact copolymer (ICP) has a two-phase structure, comprising: (a) a matrix (or main segment) comprising a polypropylene homopolymer or a propylene/alpha-olefin random copolymer which comprises greater than 50 wt. % of units derived from propylene monomer, and (b) a dispersed phase (or dispersion segment) comprising a copolymer of ethylene and a $C_3$-$C_8$ α-olefin (e.g., an ethylene-propylene copolymer).

Density is determined in accordance with ASTM D792.

As used herein, the "melt flow rate" (MFR) or "melt index" (units of g/10 min or dg/min.) is described according to and measured per ASTM D1238 using a load of 2.16 kg at 230° C.

As used herein, "$F_c$" refers to the percent by weight of the dispersed phase in the total polymer composition. In general $F_c$ is equal to the ratio of amount of dispersed rubber phase to the total amount of material made. $F_c$ can be measured by the weight percent of the total xylene solubles, i.e. that of the matrix, in the polymer composition.

Mf of the dispersed phase can be calculated following a general equation: ln (MFf)=xa ln (MFa)+xb ln (MFb), where xa is weight fraction of component A, xb is weight fraction of component B, xa+xb is equal to 1, Mfa is melt flow index of component A, MFb is melt flow index of component B, and MFf is the final melt flow of the composition having A and B. xa and xb can be measured from the data of xylene solubles and insoluble. Melt flow of the matrix and the final composition can be measured.

"Beta/alpha" (β/α) is conceptually the ratio of the molecular weight of the dispersed phase to the molecular weight of the matrix phaset. On a practical level, β/α is defined according to the following equation:

$$\beta/\alpha=[(MFR_1/MFR_2)^{0.213}-1]/(Fc/100)+1$$

where $MFR_1$ is the melt flow of matrix (or the combined matrix phase) only and $MFR_2$ is the overall melt flow of the polymer composition. In order to determine dispersed phase particle size and shape, atomic force microscopy (AFM) and transmission electron microscopy (TEM) is used.

As used herein, haze generally refers to an appearance cause by scattered light upon passing through a film or sheet of a material can produce a smoky or translucent field. The haze of the present invention is measured using ASTM D1003-97.

As used herein, clarity generally refers to the amount of luminous transmittance described according to and measured per ASTM D1003.

As used herein, flexural modulus (expressed in units of PSI) is the one percent secant modulus, which is further described according to and measured per ASTM D790 at 230° C.

As used herein, notched Izod impact strength (expressed in ft-lbs/in$^2$) was measured at 23° C. as described according to and measured per ASTM D256.

As used herein, Ceast impact was measured at 0, 4, and 23° C. according to ASTM D3763-10 in the GC configuration. It is expressed in in-lbs. This impact test is a multiaxial impact test, and may provide a more representative result for impact resistance for many applications.

As used herein, differential scanning calorimetry ("DSC") is a thermoanalytical technique in which the difference in the amount of heat required to increase the temperature of a sample and reference is measured as a function of temperature. About 5 to 10 mg of a sheet of a polymer is placed into a light aluminum pan (about 50 mg) and crimped shut. A DSC scan of the polymer sample is performed in the temperature range of −20° C. to 200° C. using a rate of 10° C./min. Melting points of crystalline phases in a polymer composition can be determined using DSC.

As used herein, a ratio of Mw solubles/Mw insolubles refers as a viscosity ratio. "Mw solubles" is weight average molecular weight of a soluble fraction of the polymer composition in xylene at 25° C. following ASTM D5492, and "Mw insolubles" is weight average molecular weight of an insoluble fraction of the polymer composition in xylene at 25° C. following ASTM D5492. The molecular weight values of the soluble fraction and the insoluble fraction were measured using gel permeation chromatography (GPC).

As used herein, a "top load value" refers to a crush load strength, which is the amount of force of load a cup can withstand before showing signs of buckling or cracking, following a testing method developed by the applicant. The samples are injection molded cups. The object of the test is to determine the crush load properties of injection molded cups to understand the fundamental stiffness and yield load characteristics of the material before buckling under a uniform compression load tester. The crush properties test is subjected to compression loads to determine the relative crush resistance of molded cups. The test uses the MTS Sintech 6 universal tester system with Test Works 3.0 software to study the load-deflection characteristics of the molded cup under parallel plate loading. The cup sits between two parallel plates—one of which is stationary. A constant speed of 0.254 centimeter/minute (0.1 inches/min) is used. A load cell measures the applied force. The test is commenced by lowering the movable crosshead at a speed of 0.254 centimeter/minute (0.1 in/min) over the specimen. A maximum load is applied until failure via buckling of the tested cup is observed.

In accordance with some embodiments, the polymer composition comprises from about 40 wt. % to about 99.9 wt. % (e.g., from about 50 wt. % to about 95 wt. %, or from about 75 wt. % to about 92 wt. %) of a matrix phase; and from about 0.01 wt. % to about 60 wt. % (e.g., from about 5 wt. % to about 50 wt. %, or from about 8 wt. % to about 25 wt. %) of a dispersed phase. The matrix phase is continuous. The weight percentages of the matrix phase and the dispersed phase are based on the total weight of the matrix phase and the dispersed phase.

The matrix phase may comprise a polypropylene polymer comprising from 0 to 7 mol. % (e.g., from 0.01 mol. % to 4 mol. %) of units derived from ethylene, a $C_4$-$C_{10}$ alpha olefin or combinations thereof. The dispersed phase may be a propylene/alpha olefin copolymer having from 10 mol. % to 70 mol. % (e.g., from 35 mol. % to 60 mol. %) of units derived from ethylene or a $C_4$-$C_{10}$ alpha olefin or combinations thereof. The weight percentage of the comonomer of ethylene or a $C_4$-$C_{10}$ alpha olefin may be in the range from 7 wt. % to 50 wt. % (e.g., from 25 wt. % to 40 wt. %). Examples of alpha-olefin as comonomer include but are not limited to butene, pentene, hexene, or octene. In some embodiments, the dispersed phase is a propylene/alpha olefin copolymer having from 40 mol. % to 57 mol. % of units derived from ethylene or a $C_4$-$C_{10}$ alpha olefin or combinations thereof.

The polymer composition satisfies the following inequality in some embodiments:

$$y \leq 55x-8,$$

wherein x is a ratio of Mw solubles/Mw insolubles and is less than or equal to 0.85, Mw solubles is weight average molecular weight of a soluble fraction of the polymer composition in xylene at 25° C. following ASTM D5492, Mw insoluble is weight average molecular weight of an insoluble fraction of the polymer composition in xylene at 25° C. following ASTM D5492, and y is the haze value being measured on a sheet with a thickness of 0.508 millimeter (20 mil) according to ASTM D1003.

The propylene polymer of the matrix phase polymer may comprise from 0.01 molar percent (mol. %) to 5 mol. % of ethylene in some embodiments.

In some embodiments, the matrix phase has a melt flow rate (MFR) of from about 0.1 dg/min. to about 10 dg/min. (for example, from about 0.1 dg/min. to about 2 dg/min.). The dispersed phase has a melt flow rate (MFR) of from about 1 dg/min. to about 200 dg/min. (for example, from about 10 dg/min. to about 200 dg/min., or from about 20 dg/min. to about 60 dg/min.). In some embodiments, the MFT of the dispersed phase is in one of the following ranges: 1-100; 1-50, 1-25 and 1-15. The dispersed phase may have an intrinsic viscosity of from about 0.5 to about 3 (e.g., from about 1 to about 2).

In some embodiments, the polymer composition comprising the matrix phase and the dispersed phase is made through an in-reactor process. The monomers are feed into a reactor for polymerization, and a resulting polymer composition having the two-phase structure described herein is obtained.

In some other embodiments, the polymer composition comprising the matrix phase and the dispersed phase is made through a post-reactor process by blending a first polymer ingredient and a second polymer ingredient. The first polymer ingredient mainly contributes to the matrix phase while the second polymer ingredient mainly contributes to the dispersed phase. For example, the first polymer ingredient may be a propylene-based homopolymer or a random copolymer. The second polymer ingredient may be an impact copolymer (ICP). When an ICP has a two-phase structure, the ICP as the second polymer ingredient may contribute to a portion of the matrix phase of the resulting polymer composition. The matrix phase of the resulting polymer composition as described herein includes the first polymer ingredient and the matrix portion of the second polymer ingredient. The matrix phase is a combined matrix phase.

In general, the first and the second polymer ingredients may have the percentages and the properties of the matrix phase and the dispersed phase as described herein. The first polymer ingredient may be in the range of from about 40 wt. % to about 99.9 wt. % (e.g., from about 50 wt. % to about 95 wt. %). The second polymer ingredient may also be in the range of from about 0.01 wt. % to about 60 wt. % (e.g., from about 5 wt. % to about 50 wt. %) based on the total weight of the first and the second polymer ingredients.

A random copolymer may comprise from 0.01 molar percent (mol. %) to 5 mol. % of ethylene in some embodiments.

The ICP may be a heterophasic (e.g., two-phase) copolymer comprising: (a) a main segment comprising a polypropylene homopolymer or a propylene/alpha-olefin random copolymer which comprises greater than 50 wt. % of units derived from propylene monomer, and (b) a dispersion segment having a copolymer derived from ethylene, a $C_3$-$C_8$ α-olefin, or any combination thereof. The ICP has a crystalline structure having at least one (e.g., one or two) melting point, for example, between 100° C. and 130° C., in some embodiments. In some embodiments, two melting points are present in a two-phase ICP. An exemplary ICP comprises ethylene and propylene, and the content of ethylene is from about 1 wt. % to 50 wt. % of the total weight of the ICP.

The ICP may be made using Ziegler-Natta catalyst in an in-reactor solution. The propylene ICP may have a two-phase structure comprising: (a) a main segment comprising a polypropylene homopolymer or a propylene/alpha-olefin random copolymer which comprises greater than 50 wt. % of units derived from propylene monomer, and (b) a dispersion segment comprising a copolymer of ethylene and a $C_3$-$C_8$ α-olefin (e.g., an ethylene-propylene copolymer). In the main segment, examples of a suitable alpha-olefin as comonomer include but are not limited to butene, pentene, hexene, or octene. In some embodiments, the main segment is a propylene/alpha olefin random copolymer optionally comprising from 0.01 wt. % to 5 wt. %, for example, less than about 2.0 wt. %, of ethylene. In some embodiments, the dispersion segment can be in the range from 5 wt. % to 20 wt. % of the total weight of the ICP. The ICP has a first melting point being greater than 100° C. and a second melting point. In some embodiments, both the first melting point and the second melting point are greater than 100° C. For example, An ICP can have a first melting point in the range of from 100° C. to 130° C. (e.g., 120° C.). The first melting point may be attributed to that of the dispersed phase in some embodiments. The second melting point may be in the range from 100° C. to 180° C. (e.g., 150° C., 165° C. or any other suitable temperature). The second melting point may be attributed to that of the matrix phase in some embodiments.

The ICP can be made using one or more matrix phase polymerization steps, occurring in one or more gas phase reactors; one or more dispersed phase polymerization steps, occurring in one or more liquid phase reactors; and at least one de-gassing step. In some embodiments, the propylene ICP is made in an in-reactor comprising monomer including propylene and a comonomer such as ethylene. The polymerization is catalyzed with Ziegler-Natta catalyst. A propylene ICP made of propylene and ethylene and consisting essentially of propylene and ethylene moieties are preferred in some embodiments.

Catalysts employed in the polymerization of α-olefins may be characterized as supported catalysts or unsupported catalysts, sometimes referred to as homogeneous catalysts. The so-called conventional Ziegler-Natta catalysts are stereospecific complexes formed from a transition metal halide and a metal alkyl or hydride, such as titanium tetrachloride supported on an active magnesium dichloride. A supported catalyst component includes, but is not necessarily limited to, titanium tetrachloride supported on an "active" anhydrous magnesium dihalide, such as magnesium dichloride or magnesium dibromide. A supported catalyst component may be employed in conjunction with a co-catalyst such as an alkylaluminum compound, for example, triethylaluminum (TEAL). The Ziegler-Natta catalysts may also incorporate an electron donor compound that may take the form of various amines, phosphenes, esters, aldehydes, and alcohols.

The propylene ICP may include a matrix and a dispersed phase. The matrix comprises a polypropylene homopolymer or a propylene/alpha-olefin random copolymer which comprises greater than 50 wt. % of units derived from propylene monomer. In some embodiments, the matrix is a propylene/alpha olefin random copolymer optionally comprising from 0.01 wt. % to 5 wt. %, for example, less than about 2.0 wt. %, of ethylene. The dispersed phase comprises a copolymer of ethylene and a $C_3$-$C_8$ α-olefin (e.g., an ethylene-propylene copolymer). In some embodiments, the dispersed phase can be in the range from 5 wt. % to 20 wt. % of the total weight of the ICP. The propylene ICP may be a copolymer comprising propylene and ethylene moieties and having two phase structures. When such an ICP is added as a second polymer ingredient, the matrix of the final polymer composition includes the combined matrix from the first and the second polymer ingredient. In some embodiments, the combined matrix includes the first polymer ingredient and the matrix portion of the ICP.

The polymer composition may further comprise a clarifying agent. The clarifying agent may be present at a final concentration equal to or less than 8,000 ppm (e.g., 1-8,000 ppm, or 5 ppm-5,000 ppm). The final concentration of the clarifying agent may include the clarifying agent in the first and/or second polymer ingredients, and the additional clarifying agents added during the step of preparing the final polymer composition. Examples of suitable clarifying agents include but are not limited to dibenzylidene sorbitol acetal derivatives such as 1,3-o-2,4-bis(3,4-dimethylbenzylidene)sorbitol (available from Milliken Chemical Company, Spartanburg, S.C., known as MILLAD® 3988), 1,3-o-2,4-bis(p-methylbenzylidene)sorbitol (available from Milliken Chemical and known as MILLAD® 3940), sodium 2,2'-methylene-bis-(4,6-di-tert-butylphenyl) phosphate (from Asahi Denka Kogyo K. K., known as NA-11), aluminum bis[2,2'-methylene-bis-(4,6-di-tert-butylphenyl) phosphate] with lithium myristate (also from Asahi Denka Kogyo K. K., known as NA-21), other suitable nucleators and combinations thereof. In some embodiments, a clarifying agent that is soluble in polypropylene (e.g., MILLAD NX8000, available from Milliken) is used to yield the smallest crystals and the best optics. However, even without a nucleating agent, the ability to improve optics has been also demonstrated.

The dispersed phase in the continuous matrix may have a phase domain size smaller than 700 nm (e.g., from 0.1 nm to 700 nm). The polymer composition may have a melt flow rate of from about 0.5 dg/min. to about 10 dg/min, for example, from about 1 dg/min. to about 10 dg/min. (measured using a load of 2.16 kg at 230° C. following ASTM D 1238). In some embodiments, the MFR of the polymer composition is one of the following ranges: 0.5-8, 0.5-6 and 0.5-4.

The composition can be made through blending/compounding the ingredients. The polymer ingredients may be combined by way of dry blending and/or melt blending. During the compounding process, a single screw or twin screw extruder, or other suitable compounding equipment can be used.

The invention aims to offer a solution that provides a unique set of properties (ductility, good optical properties, high stiffness and high heat distortion temperatures) without the addition of an external elastomer that can increase softness and create processing challenges. By taking advantages of molecular weight differences between the dispersed phase and the matrix, the dispersed phase or particles can be forced to elongate below the wavelength of light when during processing where there is either shear forces, such as injection molding of 0.508 millimeter (20 mil) thick disks, or through orientation that is imparted during the processes (such as thermoforming or blow molding). Previously it was believed that this response would only work in high shear environments typical of injection molding. Generally, high molecular weight materials (low MF<3 dg/min.) are not injection molded but are converted via processes such as thermoforming or blow molding or even cast film, where the shear is low but they are elongational forces on the materials. When the viscosity of a dispersed phase is lower than that of the matrix, the dispersed particles will elongate below the wavelength of light in high shear processes or low shear processes where some orientation is imparted.

The polymer composition may have a ratio of β/α less than 1.2 according to the formula:

$$\beta/\alpha = \frac{(MFR_1/MFR_2)^{0.213} - 1}{(Fc/100)} + 1$$

wherein $MFR_1$ is the melt flow of the matrix (or combined matrix) phase only and $MFR_2$ is the overall melt flow of the polymer composition. The calculation of the ratio of β/α is further illustrated with the examples below. The polymer composition may also have a Mw/Mn greater than 4.

The resulting polymer composition provides a combination of excellent optical transparency, toughness, impact resistance and rigidity. For example, the polymer composition after being molded has a haze value less than 30% (e.g., less than 28% or 25%, or 0.01%20%), which is measured using at an injection molded plaque having a thickness of 0.508 millimeter (20 mil) following ASTM D1003. The composition may have a flexural modulus equal to or greater than 1,000 MPa (e.g., 1,000 MPa -3,000 MPa, measured at 23° C. according to ASTM D 790), and a notched Izod impact strength equal to or greater than 1.4 ft-lbs/in$^2$ (e.g., 1.4 ft-lbs/in$^2$ 5.0 ft-lbs/in$^2$, measured at 23° C. according to ASTM D 256). The composition may have a heat deflection temperature equal to or greater than 75° C. (e.g., 75° C. -150° C., at 0.46 MPa (66 psi) according to ASTM D648.

EXAMPLES

The following polymers were used in making the examples described below. The properties of these polymers are shown in Table 1, including melting point (measured using DSC), flexural modulus (ASTM D 790A, molded and tested in accordance with ASTM D 4101), melt flow rate (ASTM D 1238, 230° C./2.16 kg), a notched Izod impact resistance (ASTM D 256, molded and tested in accordance with ASTM D 4101).

Polymer A1 is a reactor grade homopolymer (HOMO) of propylene, available from Braskem. Polymer A1 has a melt flow index of 0.8 dg/min. and a total xylene solubles of 2.5 wt. %. Polymer A1 has high melt strength and excellent rigidity.

Polymer A2 is a random copolymer (RACO) of propylene and about 2.7 wt. % of ethylene, available from Braskem. Polymer A2 has a melt flow of 2 dg/min. and an overall xylene solubles of 5.8 wt. %.

Polymer A3 is a reactor grade homopolymer (HOMO) of propylene, available from Braskem. Polymer A3 has a melt flow index of 2.0 dg/min. and a total xylene solubles of 4 wt. %.

Polymer A4 is a reactor grade homopolymer (HOMO) of propylene, available from Braskem. Polymer A4 has a melt flow index of about 1.3 dg/min. and a total xylene solubles of 4 wt. %.

Polymer A5 is a reactor grade homopolymer (HOMO) of propylene, available from Braskem. Polymer A5 has a melt flow index of about 3.4 dg/min. and a total xylene solubles of 1.7 wt. %.

Polymer A6 is a reactor grade homopolymer (HOMO) of propylene, available from Braskem. Polymer A6 has a melt flow index of about 12 dg/min. and a total xylene solubles of 3 wt. %.

Polymer A7 is a reactor grade homopolymer (HOMO) of propylene having high crystalline and MF of 35 dg/min, available from Braskem. Polymer A7 has a total xylene soluble content of 1.2 wt. %.

Polymer B1 is a heterophasic propylene ICP, available from Braskem. Polymer B1 has a two-phase structure. The matrix phase is a homopolymer of propylene with 2 wt. % of an overall xylene solubles content in the matrix. The dispersed phase is 30 wt. % of the total weight of Polymer B1, with an overall ethylene content in the final polymer of 15.6 wt. %. Polymer B1 has melting point of 163° C. (measured using DSC at a rate of 10° C./min). For the purpose of this invention, the blends with B1 are typically nucleated with 4000 ppm Milliken® NX®8000, available from Milliken Chemical Company; however, other nucleating agents and clarifying agents were also studied.

Polymer B2 is a heterophasic propylene ICP, available from Braskem. Polymer B2 has a two-phase structure. The matrix phase is homopolymer of propylene with 1.6 wt. % of an overall xylene solubles content in the matrix. The dispersed phase is 12 wt. % of the total weight of Polymer B2, and has a total overall ethylene content of 10 wt. %. Polymer B2 has melting point of 165° C. (measured using DSC at a rate of 10° C./min). The pellets are generally nucleated with ppm micronized sodium benzoate in order to increase crystallization temperature and flexural modulus. A higher performing nucleating agent and/or clarifying agent is not used as this product is not expected to produce transparent parts. When Polymer B2 is blended into a thermoforming grade homopolymer (polypropylene) having a low melt flow index, impact resistance can be improved compared to the homopolymer. However, the blend is essentially white due to poor haze. As comparison, optically clear compositions having much higher toughness and impact resistance can be achieved in accordance with some embodiments in the present disclosure.

Milliken® NX®8000, available from Milliken Chemical Company, is a clarifying agent that is soluble in polypropylene.

TABLE 1

| | Type of polymer | Melt Flow (230° C., 2.16 kg) | Flexible Modulus (0.05 inch/minute, 1% secant) | | Notched Izod Impact Strength (23° C.) | | Tensile Strength (at yield, 2 inch/minute) | |
|---|---|---|---|---|---|---|---|---|
| | | D1238 | D790A | | D256A | | D638 | |
| | | | | | Units | | | |
| | | g/10 min. | psi | MPa | ft-lb/in | J/m | psi | MPa |
| Polymer A1 | HOMO | 0.8 | 190,000 | 1,310 | 0.8 | 43 | 5,200 | 36 |
| Polymer A2 | RACO | 2.0 | 170,000 | 1,172 | 1.2 | 64 | 4,600 | 32 |
| Polymer A3 | HOMO | 2.0 | 250,000 | 1,724 | 0.6 | 32 | 5450 | 38 |
| Polymer A4 | HOMO | 1.3 | 185,000 | 1,276 | 0.5 | 27 | 4,800 | 33 |
| Polymer A5 | HOMO | 3.6 | 140,000 | 1,655 | 0.7 | 37 | 5,500 | 37 |
| Polymer A6 | HOMO | 12.0 | 230,000 | 1,586 | 0.6 | 32 | 5,400 | 37 |
| Polymer A7 | HOMO | 35.0 | 300,000 | 2,069 | 0.4 | 21 | 6,000 | 41 |
| Polymer B1 | ICP | 50.0 | 138,000 | 952 | 3.0 | 160 | 3,200 | 22 |
| Polymer B2 | ICP | 2.0 | 180,000 | 1,241 | NB | NB | 4,000 | 28 |

Table 2 summarizes the formulations and the properties of experimental examples (Ex. 1-7). The first two examples (Ex. 1 and Ex. 2) are two preferred examples in some embodiments. Examples 3-6 show that when both the ICP (i.e. the dispersion phase) and the random copolymer or the homopolymer (i.e. the matrix) have the same melt index (e.g., 2 dg/min.), impact resistance is improved compared to the matrix itself. However, the haze is high. Example 7 shows that the improvement in haze can be also achieved without using a clarifying agent in some embodiments. Polymer A1 has a haze of 25.4% and non-nucleated Polymer B1 has a haze of 88% (both on 0.508 millimeter (20 mil) injection molded plaques). For the Polymer A1/Polymer B1 (70/30 by weight) blend with no added clarifier or nucleation shows a haze of 22.9% on a 0.508 millimeter (20 mil) injection molded plaque, which is much lower than a predicted haze value of 44.2% based on weight fractions and haze of the ingredients. This improvement shows a synergetic effect, and improvement is due to better rubber dispersion and elongation smaller than the wavelength of light.

dispersed rubber (or called bipolymer) phase in the total polymer composition. In the polymer composition in this disclosure, Fc refers to the weight percentage of all the pure "rubber" phase of the ICP portion in the total polymer composition. The combined matrix phase includes the matrix of the first polymer ingredient (e.g., homopolymer) and the matrix from the ICP portion. Generally the size of the dispersed phase decreases as the ratio of $\beta/\alpha$ decreases.

A pseudo "Rubber MF" are calculated for the ICP component, which comprises a main segment (or ICP matrix) and a dispersion segment (or ICP rubber phase), using the following equation:

"Rubber $MF$"=EXP((ln(Final ICP $MF$)−Fraction Matrix*ln(Matrix $MF$))/Fraction Rubber).

For example, a 50 MF ICP containing 30% rubber and a matrix MF of 145 yields a "Rubber MF" of 4.2 dg/min. "Rubber MF"=EXP((ln(50)−0.7*ln(145))/0.3=4.2

This ICP having MF of 50 was then blended into a material with a much higher molecular weight (either a

TABLE 2

|  | Ex. 1 | Ex. 2 | Ex. 3 | Ex. 4 | Ex. 5 | Ex. 6 | Ex. 7 |
| --- | --- | --- | --- | --- | --- | --- | --- |
| Polymer A1 (wt. %) | 70 |  |  |  |  |  | 70 |
| Polymer A2 (wt. %) |  | 80 |  |  | 75 | 50 |  |
| Polymer A3 (wt. %) |  |  | 75 | 50 |  |  |  |
| Polymer B1 (wt. %) | 30 | 20 |  |  |  |  | 30 |
| Polymer B2 (wt. %) |  |  | 25 | 50 | 25 | 50 |  |
| NX 8000 (ppm) | 4,000 | 4,000 | 600 ppm HPN600 | 400 ppm HPN600 | 1500 | 1000 | 0 |
| Haze (%, 0.508 mm thick disk) | 15.8 | 13.5 | 61.2 | 80.3 | 47.5 | 77.9 | 22.9 |
| Izod % Partial Break | 10 | 10 | 0 | 0 | 0 | 0 |  |
| Izod Impact Strength (ft.lbs/in) | 6.1 | 6.7 | 1.4 | 2.0 | 1.7 | 2.9 |  |
| (J/m) | 325.7 | 357.7 | 74.7 | 106.8 | 90.8 | 154.8 |  |
| ASTM 3763 Instrumented Impact at 0° C. (ft-lbs) | 31.5 | 29.2 | 7.8 | 28.0 | 30.0 | 30.0 |  |
| (N · m) | 42.7 | 39.6 | 10.6 | 38.0 | 40.7 | 40.7 |  |
| ASTM 3763 Instrumented Impact at 4° C. (ft-lbs) |  |  | 2.7 | 24.3 | 23.1 | 30.9 |  |
| (N · m) |  |  | 3.7 | 32.9 | 31.3 | 41.9 |  |
| Flexible Modulus (psi) | 213,590 | 150,505 | 222,582 | 227,614 | 160,821 | 168,150 |  |
| (MPa) | 1,473 | 1,038 | 1,535 | 1,570 | 1,109 | 1,160 |  |
| HDT at 66 psi (° C.) | 95.2 | 77.8 |  |  |  |  |  |

Although this invention is not bound by any theory, the ratios of $\beta/\alpha$ are calculated to verify the ability for the dispersed to elongate below the wavelength of light even in low shear applications.

The polymer composition may have a ratio of $\beta/\alpha$ less than 1.2 according to the formula:

$$\beta/\alpha = \frac{(MFR_1/MFR_2)^{0.213} - 1}{(Fc/100)} + 1$$

wherein $MFR_1$ is the melt flow of the combined matrix phase only, $MFR_2$ is the overall melt flow of the polymer composition, and "$F_c$" refers to the percent by weight of the homopolymer or a random copolymer), such as a fraction melt flow homopolymer having a melt flow of 0.8 dg/min. To determine the $\beta/\alpha$ of this final blend, several calculations were performed. First, the overall matrix MF of the combination of the low MW ICP and the high MW matrix was determined by the following:

Combined Matrix Melt Flow=EXP(((Fraction of High $MW$ Matrix*ln($MF$ of High $MW$ Matrix))+(Fraction of Low $MW$ Matrix*ln($MF$ of Low $MW$ Matrix)))

The Fraction Low MW Matrix is calculated as follows:

Fraction Low $MW$ Matrix=(1−Fraction High $MW$ Matrix)*(1−Fraction Bipolymer in Low $MW$ ICP)

For example, a 70% blend of a high MF Matrix having a MF of 0.8 dg/min with a 30% blend of a low MW ICP having a final matrix MF of 145 and a fraction bipolymer of 0.30 results in a Combined Matrix Melt Flow of 2.4 dg/min.

Fraction Low $MW$ Matrix=(1−0.7)*(1−0.3)=0.21

Combined Matrix Melt Flow (MFR$_1$)=EXP(((0.71*ln(0.8))+(0.21*ln(145)))=2.4

The new combined amount of bipolymer must be calculated using the following:

Overall Fraction Bipolymer=Fraction of Low $MW$ ICP*Fraction Bipolymer in Low $MW$ ICP.

A 30% blend of such an ICP results in an overall fraction of bipolymer of 0.09. Overall Fraction Bipolymer (Fc)= 0.3*0.3=0.09

The new Fraction Combined Matrix is calculated as follows:

Fraction Combined Matrix=1−Overall Fraction Bipolymer

For this example, Fraction Combined Matrix=1−0.09=0.91

The new overall final melt flow of the combination can be calculated using the following equation:

Overall Final Melt Flow (MFR$_2$)=EXP((Fraction Combined Matrix*ln(Combined Matrix $MF$)+ (Overall Fraction Bipolymer*ln(Rubber $MF$)))

Overall Final Melt Flow (MFR$_2$)=EXP((0.91*ln(2.4))+(0.9*ln(4.2)))=2.6

Finally the $\beta/\alpha$ can be calculated:

$\beta/\alpha$=1+((2.4/2.6)^0.213−1)/(0.09)=0.88

The rubber phase will have an increased ability to elongate below the wavelength of light as $\beta/\alpha$ decreases. It is more desirable that $\beta/\alpha$ is less than 1. As shown in Table 3, clarity of a 0.508 millimeter (20 mil) thick injection molded disk significantly increases as the $\beta/\alpha$ increases; however, with these combinations, the amount of rubber also increases.

TABLE 3

|  | Ex. 8 | Ex. 9 | Ex. 10 |
|---|---|---|---|
| Polymer A1 (wt. %) | 70 | 60 | 50 |
| Polymer B1 (wt. %) | 30 | 40 | 50 |
| Calculated $\beta/\alpha$ | 0.88 | 0.96 | 1.04 |
| Haze (%, 0.508 mm disk) | 15.8 | 25.8 | 43.4 |

Figure 1:
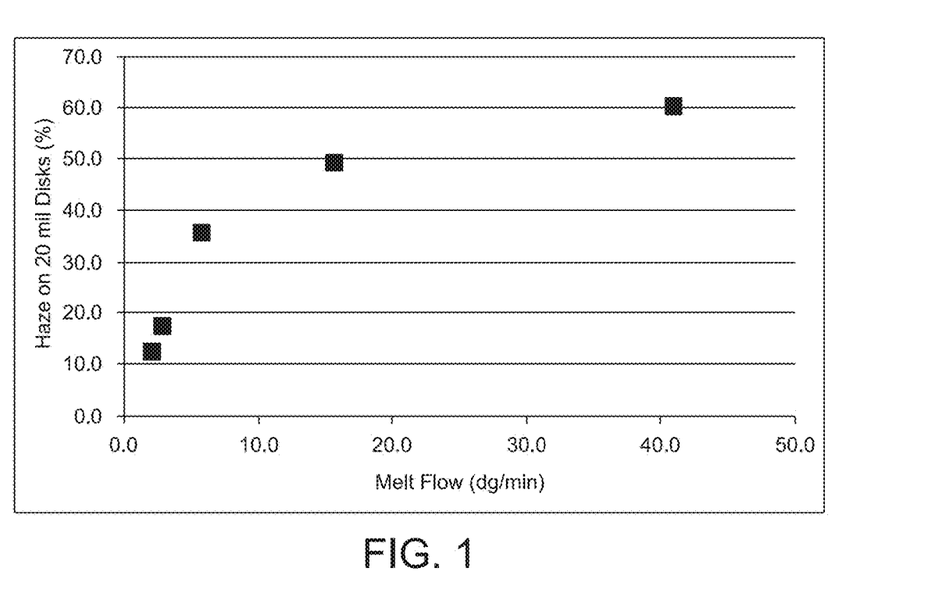
FIG. 1 illustrates the effect of the melt flow of the polymer composition on its haze in accordance with some embodiments.

In order to study the effect of $\beta/\alpha$ without increasing the amount of rubber, an additional set of experiments were conducted where the overall rubber amount was not changed but instead, the high molecular weight matrix was varied. The results are summarized in Table 4. The materials (Ex. 10-14) were blended and re-extruded using the same additive package, including the same clarifying agent of the same amount. FIG. 1 shows the effect of the melt flow of the polymer composition on its haze.

TABLE 4

|  | Ex. 11 | Ex. 12 | Ex. 13 | Ex. 14 | Ex. 15 |
|---|---|---|---|---|---|
| Polymer A1 (wt. %) | 70 |  |  |  |  |
| Polymer A5 (wt. %) |  | 70 |  |  |  |
| Polymer A6 (wt. %) |  |  | 70 |  |  |
| Polymer A7 (wt. %) |  |  |  | 70 |  |
| Polymer A8 (wt. %) |  |  |  |  | 70 |
| Polymer B1 (wt. %) | 30 | 30 | 30 | 30 | 30 |
| NX 8000 (ppm) | 4,000 | 4,000 | 4,000 | 4,000 | 4,000 |
| MF of polymer B1 (ICP) (dg/min.) | 50 | 50 | 50 | 50 | 50 |
| MF of HOMO (A1, A6-A8) | 0.8 | 1.3 | 3.6 | 12.0 | 35.0 |
| Resulting combined MF (dg/min.) | 2.1 | 2.9 | 5.9 | 15.8 | 41.0 |
| Haze on 0.508 mm thick disks (%) | 12.4 | 17.2 | 35.5 | 49.2 | 59.9 |
| PDI (Mw/Mn) | 4.3 | 4.7 |  |  |  |
| Mw Solubles/Mw Insolubles | 0.60 | 0.63 | 0.81 | expected to be ~1 | 1.14 |

Figure 2:
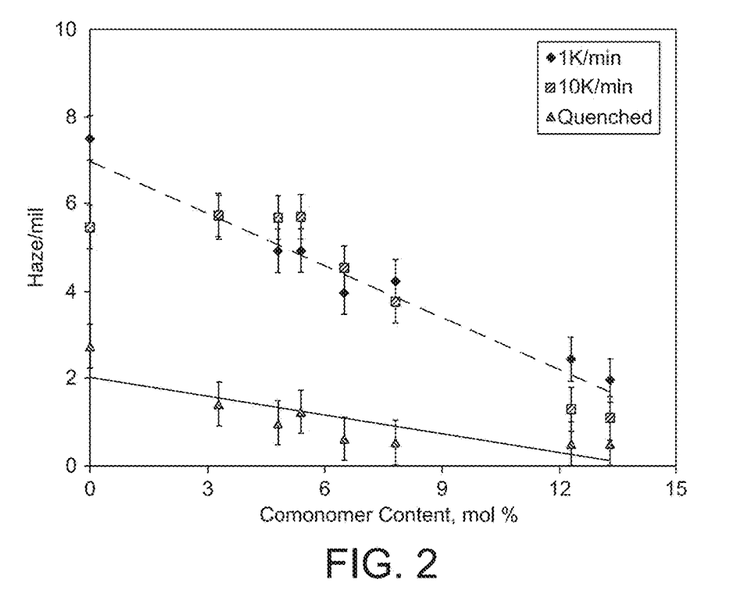
FIG. 2 illustrates haze of polypropylene based composition as a function of comonomer (e.g., ethylene) content in the matrix in some embodiments.
Figure 3:
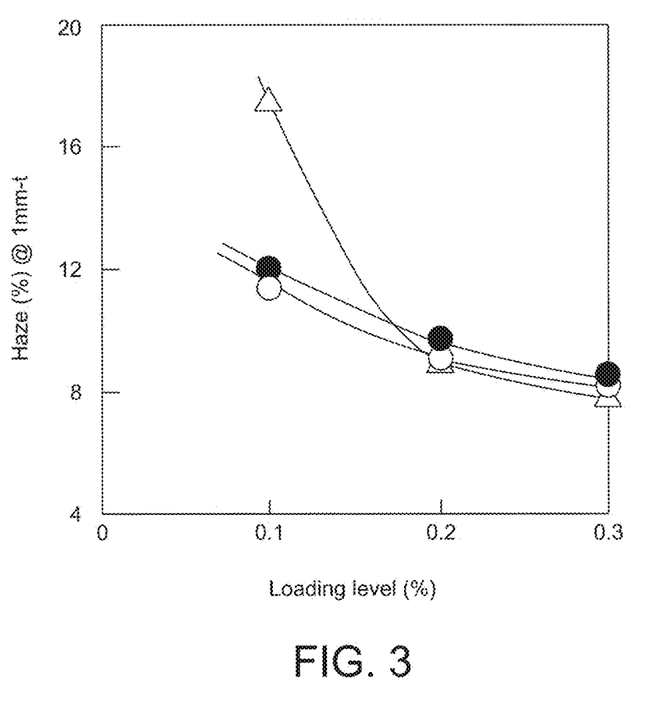
FIG. 3 illustrates haze of polypropylene based composition as a function of loading percentage of a clarifying agent in some embodiments.
Figure 4A:
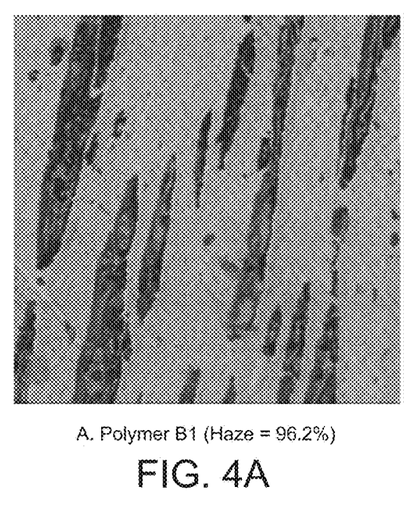
FIGS. 4A-4D show atomic force microscopy (AFM) images of the experimental samples (1000× magnification, 14.5 µm across in each image).
Figure 4B:
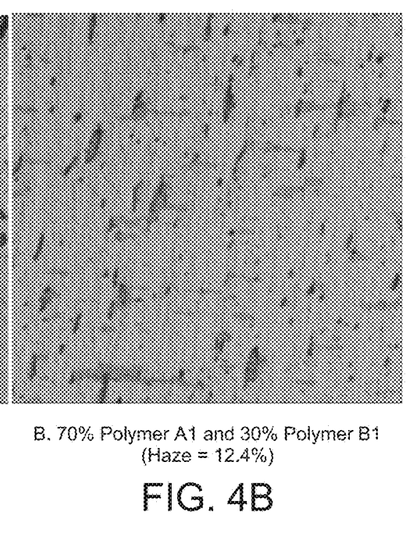
Figure 4C:
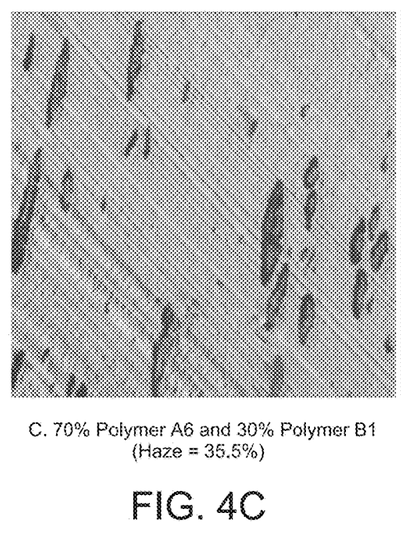
Figure 4D:
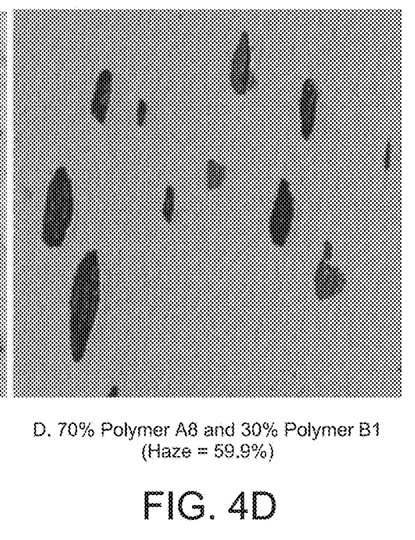

As a comparison, haze of polypropylene is generally understood to be a function of comonomer content in the matrix (typically ethylene) and clarifier loading levels, as shown in FIG. 2 and FIG. 3.

In the experiments, a clarifying agent that is soluble in polypropylene was used to yield the smallest crystals and the best optics. However, even without a nucleating agent, the ability to improve optics has also been demonstrated.

As shown in Table 5, an impact copolymer (ICP), even when heavily clarified (e.g., with 4000 ppm NX8000 in Comparative Example CEx. 2) does not yield good optical properties. It is opaque because the rubber particles scatter large amounts of light due to their size and spherical nature. Homopolymers, on the other hand, exhibit good optical properties when they are combined with a large loading of a clarifying agent (CEx. 1), but provide relatively low impact resistance. For homopolymers and random copolymers that are blended, the resulting haze is usually a function of the fractions and the individual haze components:

Resulting Haze=Fraction $PP1$*Haze of $PP1$+Fraction of $PP2$*Haze of $PP2$

For Ex. 1 in Table 5, the calculated (or expected) haze should be: Resulting Haze=(0.7*7.0)+(0.3*96.2)=33.8%. However, Ex. 1 actually shows that the haze is significantly lower (15.8%), that indicates a synergistic effect between the two materials when they are combined.

TABLE 5

|  | Ex. 1 | CEx. 1 | CEx. 2 |
| --- | --- | --- | --- |
| Polymer A1 (wt. %) | 70 | 100 |  |
| Polymer B1 (wt. %) | 30 |  | 100 |
| NX 8000 (ppm) | 4,000 | 4,000 | 4,000 |
| Estimated β/α | 0.88 |  | 1.8 |
| Haze (%, 20 mil disk) | 15.8 | 7.0 | 96.2 |
| Izod % Partial Break | 10 | 0 |  |
| Izod Impact (ft · lbs/in) | 7.1 | 1.1 |  |

FIGS. 4A-4D show AFM images of the experimental samples at 1000× magnification. Each image shows a sample size of 14.5 μm across. The dispersed rubber phases have a size of less than 700 nm.

The polymer composition can be achieved as a single pellet solution via proper product design, in which a high molecular weight matrix and a lower molecular weight rubber are utilized. One example (Example 16) of such a design is:
  Homopolymer Matrix Melt Flow=1.8
  Fraction Bipolymer=0.10
  Final ICP Melt Flow=2.0 dg/min.
  Calculated β/α=0.78

Example 16 is was made by compounding 70 wt. % Polymer A1 powder and 30% Polymer B1 powder with the following additives:
  1200 ppm AO B215 (antioxidant for MW control)_
  300 ppm Hydrotalcite V (acid scavenger)
  2000 ppm GMS 90V (anti-stat/mold release)
  4000 ppm NX8000 (clarifying agent)

The compounding was performed on an 18 mm twin screw extruder using an average temperature profile of 210° C., a screw speed of 250 rpm and a feed rate of 6.0 kg/hr.

Examples 1-15 above were made by a post-reactor process by blending a first and a second polymer ingredients as described above. Examples 16-21 below were made by an in-reactor process in which the polymer composition was obtained through the in-reactor polymerization process.

Examples 17-21 in Table 6 further illustrate the polymer compositions achieved as an in reactor single pellet solution via proper product design, in which a high molecular weight matrix and a lower molecular weight rubber are utilized. Examples 17-21 are ICPs obtained through an in-reactor process, and have a two-phase structure. The matrix phase is a propylene homopolymer with 2 wt. % of the of the overall xylene solubles in the matrix. The amount of the dispersed phase, the molecular weight of the dispersed phase, and the ethylene content in the dispersed phase were varied. Pellets were made by compounding one of the heterophasic propylene ICP with:
  1200 ppm AO B215 (antioxidant for MW control)
  300 ppm Hydrotalcite V (acid scavenger)
  2000 ppm GMS 90V (anti-stat/mold release)
  4000 ppm NX8000 (clarifying agent)

TABLE 6

|  | Ex. 17 | Ex. 18 | Ex. 19 | Ex. 20 | Ex. 21 |
| --- | --- | --- | --- | --- | --- |
| MF of ICP | 1.6 | 2.4 | 1.7 | 1.5 | 2.2 |
| Dispersed Phase (wt. %) | 9.7 | 10.8 | 12.88 | 18.64 | 18.8 |
| Total ethylene (wt. %) | 4.87 | 5.41 | 4.82 | 6.615 | 7.7 |
| Mw Solubles/Mw Insolubles | 0.43 | 0.32 | 0.52 | 0.53 | 0.47 |
| Calculated β/α | 1 | 0.47 | 0.68 | 0.49 | 0.95 |
| PDI | 4.2 | 4.4 | 4.2 | 4.0 | 3.9 |
| Haze (%, 0.508 mm thick disk) | 8.4 | 8.8 | 8.9 | 11.6 | 13.7 |
| Izod % Partial Break | 100 | 100 | 100 | 100 | Non break |
| Izod Impact (ft · lbs/in) | 7.077 | 7.313 | 7.483 | 7.541 | 7.374 |
| Flexible Modulus (psi) | 235105 | 233249 | 220537 | 183129 | 204693 |
| HDT at 66 psi (° C.) | 103.6 | 100.4 | 96.7 | 89.6 | 94.5 |

Figure 5:
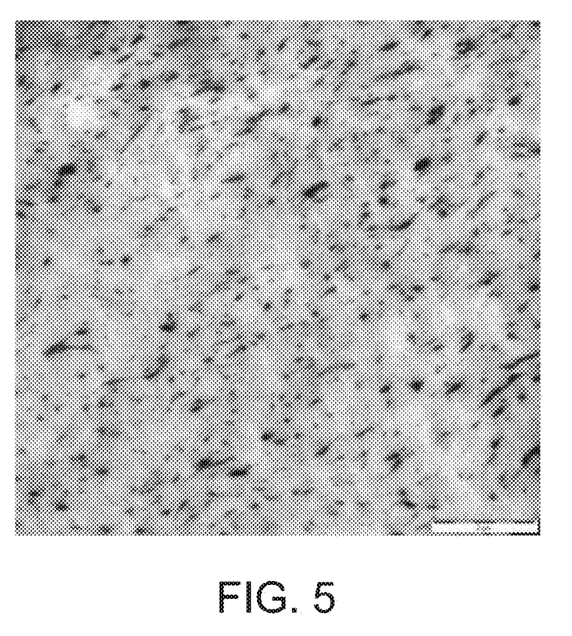
FIG. 5 is a transmission electronic microscopy (TEM) image of the experimental sample (Ex. 20) (2 µm of legend mark and 10.52×15.2 µm for field of view in size).

FIG. 5 shows an exemplary TEM image of the experimental samples such as Example 20. Example 20 is a sample made through an in-reactor polymerization. The image shows a sample size of 14.5 μm across. The dispersed rubber phases have a size of less than 700 nm.

Figure 6A:
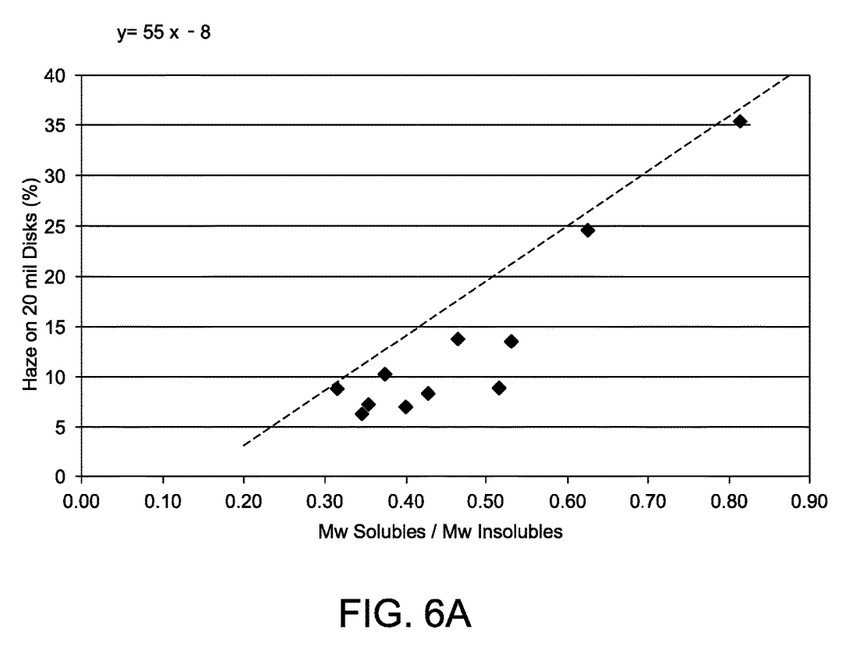
FIGS. 6A-6B illustrate haze of the polymer composition as a function of Mw solubles/Mw Insolubles in some embodiments.
Figure 6B:
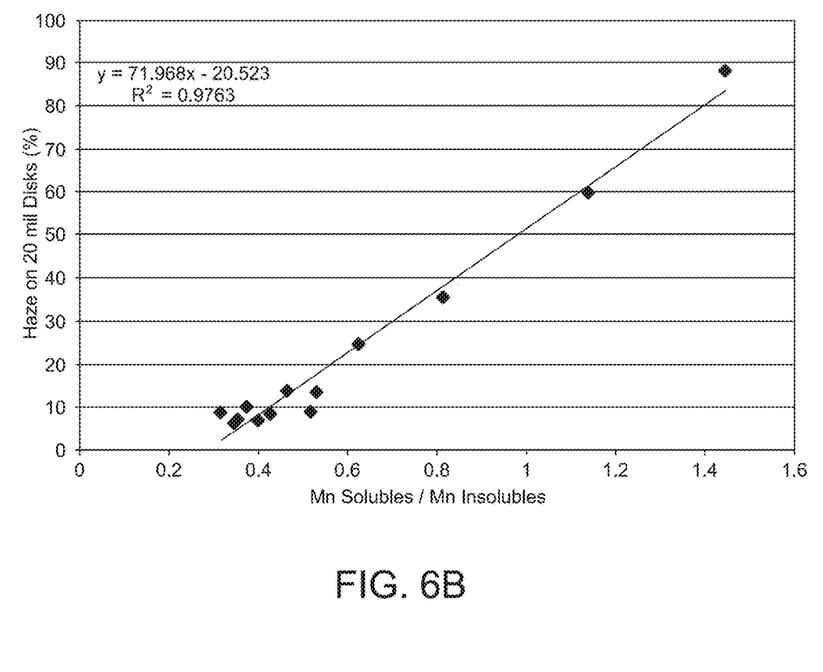

FIGS. 6A-6B illustrate haze of the polymer composition as a function of a viscosity ratio (Mw solubles/Mw Insolubles) in some embodiments. FIG. 6A shows the data for Examples 11-13 and 17-21. FIG. 6B shows the data for Examples 11-21 and B 1.

In another respect, the present disclosure provides a fabricated article comprising the polymer composition described above, and a method for making the fabricated article. For example, such a fabricated article might be manufactured by a blow molding or thermoforming process. The material in the fabricated article has the structure and the properties as described above. For example, the article has a haze value less than 30%. The article has a top load value greater than 20 lb-ft.

Although the subject matter has been described in terms of exemplary embodiments, it is not limited thereto. Rather, the appended claims should be construed broadly, to include other variants and embodiments, which may be made by those skilled in the art.

What is claimed is:

1. A polymer composition, comprising:
   from about 50 weight percent (wt. %) to about 95 wt. % of a matrix phase comprising a polypropylene polymer comprising from 0 to 7 mole percent (mol. %) of units derived from ethylene, a $C_4$-$C_{10}$ alpha olefin or combinations thereof;
   from about 5 wt. % to about 50 wt. % of a dispersed phase being a propylene/alpha olefin copolymer having from 10 mol. % to 70 mol. % of units derived from ethylene or a $C_4$-$C_{10}$ alpha olefin or combinations thereof,
   wherein the weight percentages of the matrix phase and the dispersed phase are based on the total weight of the matrix phase and the dispersed phase, and
   the polymer composition satisfies the following inequality:
   y≤55x −8, wherein x is a ratio of Mw solubles/Mw insolubles and is less than or equal to 0.85, Mw solubles is weight average molecular weight of a soluble fraction of the polymer composition in xylene at 25° C. following ASTM D5492, Mw insoluble is weight average molecular weight of an insoluble fraction of the polymer composition in xylene at 25° C. following ASTM D5492, and y is the haze value being measured on a 0.508 millimeter (20 mil) thick injection molded plaque according to ASTM D1003; and
   wherein the matrix phase has a melt flow rate of from about 0.1 dg/min. to about 10 dg/min.; and the dispersed phase has a melt flow rate of from about 1 dg/min. to about 200 dg/min., being measured using a load of 2.16 kg at 230 ° C. following ASTM D 1238.

2. The polymer composition of claim 1, wherein the dispersed phase comprises from 35 mol. % to 60 mol. % of units derived from ethylene or a $C_4$-$C_{10}$ alpha olefin or combinations thereof.

3. The polymer composition of claim 1, wherein the dispersed phase has an intrinsic viscosity of from about 0.5 to about 3.

4. The polymer composition of claim 1, wherein the polypropylene polymer of the matrix phase comprises from 0.01 mol. % to 5 mol. % of ethylene.

5. The polymer composition of claim 1, further comprising a clarifying agent.

6. The polymer composition of claim 5, wherein the clarifying agent is present at a final concentration less than 8000 ppm.

7. The polymer composition of claim 1, wherein the haze value is less than 30%, the haze value being measured using at an injection molded plaque having a thickness of 0.508 millimeter (20 mil) following ASTM D1003.

8. The polymer composition of claim 1, wherein the copolymer of the dispersed phase has a domain size smaller than 700 nanometers (nm).

9. The polymer composition of claim 1, wherein the polymer composition has a melt flow rate of from about 0.5 dg/min. to about 10 dg/min., the melt flow rates being measured using a load of 2.16 kg at 230 ° C. following ASTM D 1238.

10. The polymer composition of claim 1, wherein the polymer composition has a flexural modulus greater than 1000 MPa at 23 ° C. according to ASTM D 790.

11. The polymer composition of claim 1, wherein the polymer composition has a notched Izod impact strength greater than 5 ft-lbs/in$^2$ measured at 23 ° C. according to ASTM D 256.

12. The polymer composition of claim 1, wherein the polymer composition has a ratio of β/α less than 1.2 according to the formula:

$$\beta/\alpha = \frac{(MFR_1/MFR_2)^{0.213} - 1}{(Fc/100)} + 1$$

wherein $MFR_1$ is the melt flow of the matrix phase only, $MFR_2$ is the overall melt flow of the polymer composition, and $F_c$ is the weight percentage of the dispersed phase in the polymer composition.

13. The polymer composition of claim 1, having a Mw/Mn equal to or greater than 4.

14. The polymer composition of claim 1, having a heat deflection temperature (HDT) greater than 75° C. at 0.46 MPa (66 psi) according to ASTM D648.

15. The polymer composition of claim 1, having a viscosity ratio (Mw solubles/Mw insolubles) less than 0.8.

16. A fabricated article, comprising the polymer composition of claim 1.

17. The fabricated article of claim 16, manufactured by a blow molding or thermoforming process.

18. The fabricated article of claim 16, wherein the copolymer of the dispersed phase in the matrix has a phase domain size smaller than 700 nm.

19. The fabricated article of claim 16, wherein the article has a haze value less than 30%.

20. The fabricated article of claim 16, wherein the article has a top load value greater than 20 lb-ft.

* * * * *